(12) United States Patent
Van Wiemeersch et al.

(10) Patent No.: US 9,065,157 B2
(45) Date of Patent: Jun. 23, 2015

(54) SYSTEM AND METHOD FOR REDUCING THERMAL CONDITIONS DURING WIRELESS CHARGING

(71) Applicant: Ford Global Technologies, LLC, Dearborn, MI (US)

(72) Inventors: John Robert Van Wiemeersch, Novi, MI (US); Michael Hrecznyj, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 314 days.

(21) Appl. No.: 13/672,072

(22) Filed: Nov. 8, 2012

(65) Prior Publication Data

US 2014/0125277 A1    May 8, 2014

(51) Int. Cl.
  *H01M 10/46*   (2006.01)
  *H01M 10/48*   (2006.01)
  *H01M 10/44*   (2006.01)
  *H02J 7/00*    (2006.01)
  *H02J 17/00*   (2006.01)

(52) U.S. Cl.
  CPC ............ *H01M 10/486* (2013.01); *H01M 10/44* (2013.01); *H02J 7/00* (2013.01); *H02J 17/00* (2013.01)

(58) Field of Classification Search
  CPC ........ H02J 7/0045; H02J 7/025; H02J 7/0091
  USPC .......... 320/104, 107, 108, 114, 115, 150, 153
  See application file for complete search history.

(56) References Cited

U.S. PATENT DOCUMENTS

| | | | |
|---|---|---|---|
| 6,075,340 A * | 6/2000 | Koenck | 320/112 |
| 7,932,638 B2 | 4/2011 | Randall | |
| 8,102,147 B2 | 1/2012 | Jung | |
| 8,120,311 B2 | 2/2012 | Baarman et al. | |
| 8,169,185 B2 | 5/2012 | Partovi et al. | |
| 2010/0253281 A1 * | 10/2010 | Li | 320/108 |
| 2011/0018679 A1 * | 1/2011 | Davis et al. | 340/3.1 |
| 2011/0291613 A1 * | 12/2011 | Rosik et al. | 320/108 |

* cited by examiner

*Primary Examiner* — Edward Tso
(74) *Attorney, Agent, or Firm* — Frank MacKenzie; Price Heneveld LLP

(57) ABSTRACT

A method is provided for reducing unsafe thermal conditions in an inductive charging system within a vehicle. The method includes inductively charging a chargeable device with an inductive charger. The method also includes adjusting an amount of power provided to the chargeable device by the charger based on the detected temperature information. The method further includes storing temperature metrics related to at least one chargeable device in a database. The method also includes shutting off the inductive charger if it detects the device on the inductive charger is also connected to a wired charging source.

18 Claims, 9 Drawing Sheets

SYSTEM AND METHOD FOR REDUCING THERMAL CONDITIONS DURING WIRELESS CHARGING

FIELD OF THE INVENTION

The present invention generally relates to wireless charging systems, and more particularly relates to reducing excessive thermal conditions during wireless charging of portable devices in a vehicle.

BACKGROUND OF THE INVENTION

Portable battery operated electronic devices, such as cell phones, employ rechargeable batteries that must be recharged when battery charge is consumed. Typically, electric powered or electronic devices are physically connected to an electrical charger via a wire connection. More recently, wireless charging devices such as inductive chargers are available to charge the battery without any physical wire connection between the electronic device and the charging device. Wireless chargers generate an electromagnetic field through the use of electromagnetic transducers to transfer the electric energy from the charging device to a receiver on a battery or device managing battery charging. Inductive chargers generate a magnetic field through the use of inductive coils to transfer the electric energy from the charging device to a receiver on a battery or device—managing battery charging. Inductive chargers have been proposed for use in various locations within the cockpit of a vehicle for charging a portable battery or a battery operated device. Typically, the charger is near the driver and passengers, for the sake of convenience to allow easy access to the devices. However, wireless charging of a device at temperatures that are beyond what the charging device is designed to operate may produce damage to the device and/or the battery of the device being charged. It is therefore desirable to provide a wireless charger and/or system in a manner that minimizes charging beyond temperatures that the device is designed, thereby reducing damage to the device and/or battery of the device being charged.

SUMMARY OF THE INVENTION

According to one aspect of the present invention, a method for managing thermal conditions in a wireless charging system is provided. The method includes the steps of wirelessly charging a chargeable device with a wireless charger, and detecting temperature information related to said wireless charging. The method also includes the step of adjusting an amount of power provided to the chargeable device by the charger based on the detected temperature information.

According to another aspect of the present invention, a charging system for managing thermal conditions in a wireless charging system is provided. The charging system includes a wirelessly powered charger. The charging system also includes a controller that detects temperature information related to the wirelessly powered charger, and adjusts an amount of power provided to the chargeable device by the charger based on the detected temperature information.

According to a further aspect of the present invention, an in-vehicle system for managing thermal conditions in a wireless charging system is provided. The wireless charging system includes an inductively powered charger and a controller that detects temperature information related to the wirelessly powered charger and adjusts an amount of power provided to the chargeable device by the charger based on the detected temperature information. The wireless charging system also includes a connectivity system that stores temperature metrics related to at least one chargeable device in a database.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 5 is a schematic block diagram of a wireless charging system configured to minimize charging of a device under temperatures that the device is not designed to operate in;

DETAILED DESCRIPTION OF THE PREFERRED EMBODIMENTS

As required, detailed embodiments of the present invention are disclosed herein; however, it is to be understood that the disclosed embodiments are merely exemplary of the invention that may be embodied in various and alternative forms. The figures are not necessarily to a detailed design; some schematics may be exaggerated or minimized to show function overview. Therefore, specific structural and functional details disclosed herein are not to be interpreted as limiting, but merely as a representative basis for teaching one skilled in the art to variously employ the present invention.

Figure 1:
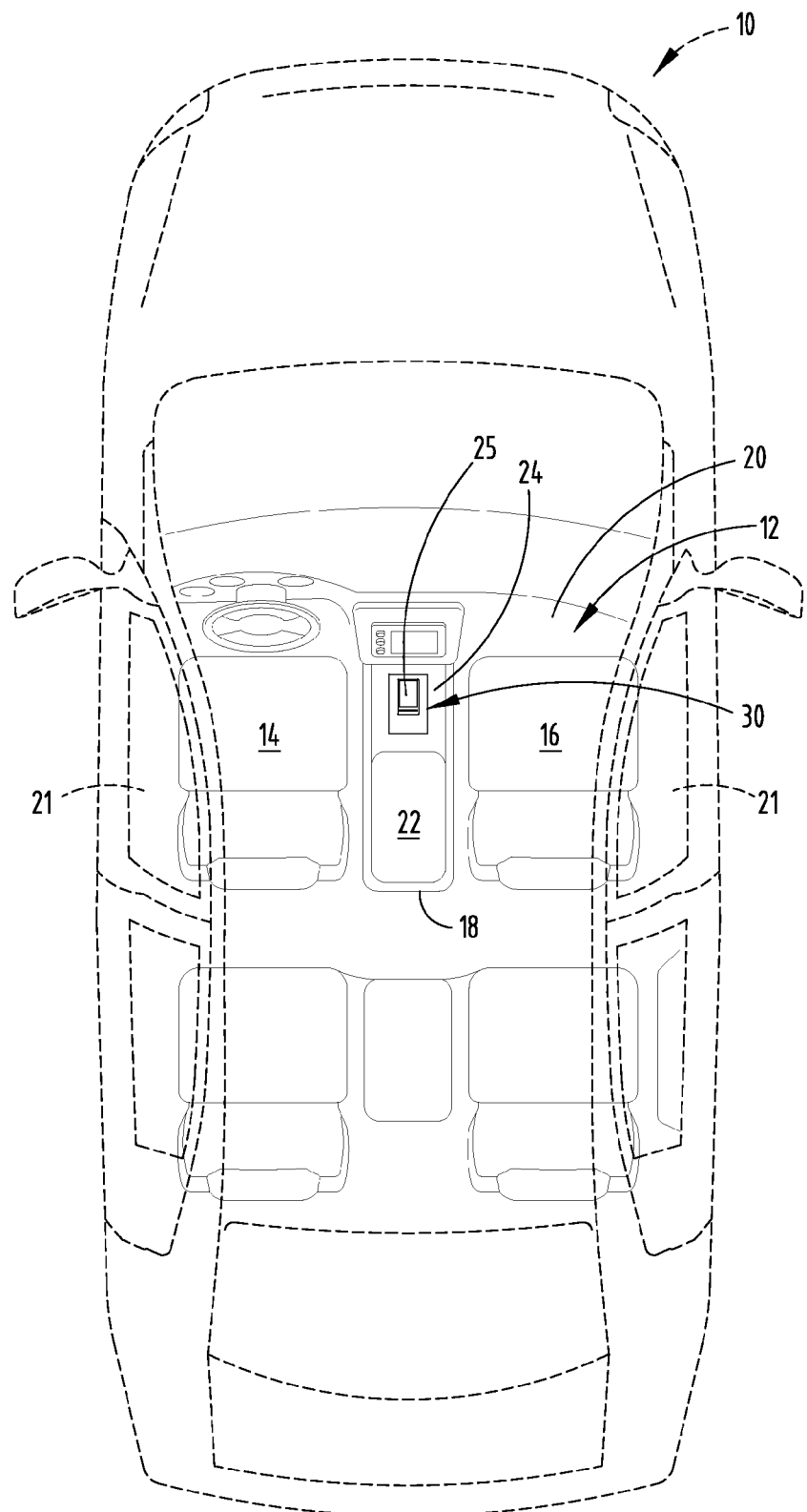
FIG. 1 is a perspective view of a cockpit of a vehicle employing a wireless charger at a potential charging region, according to one embodiment.
Figure 2:
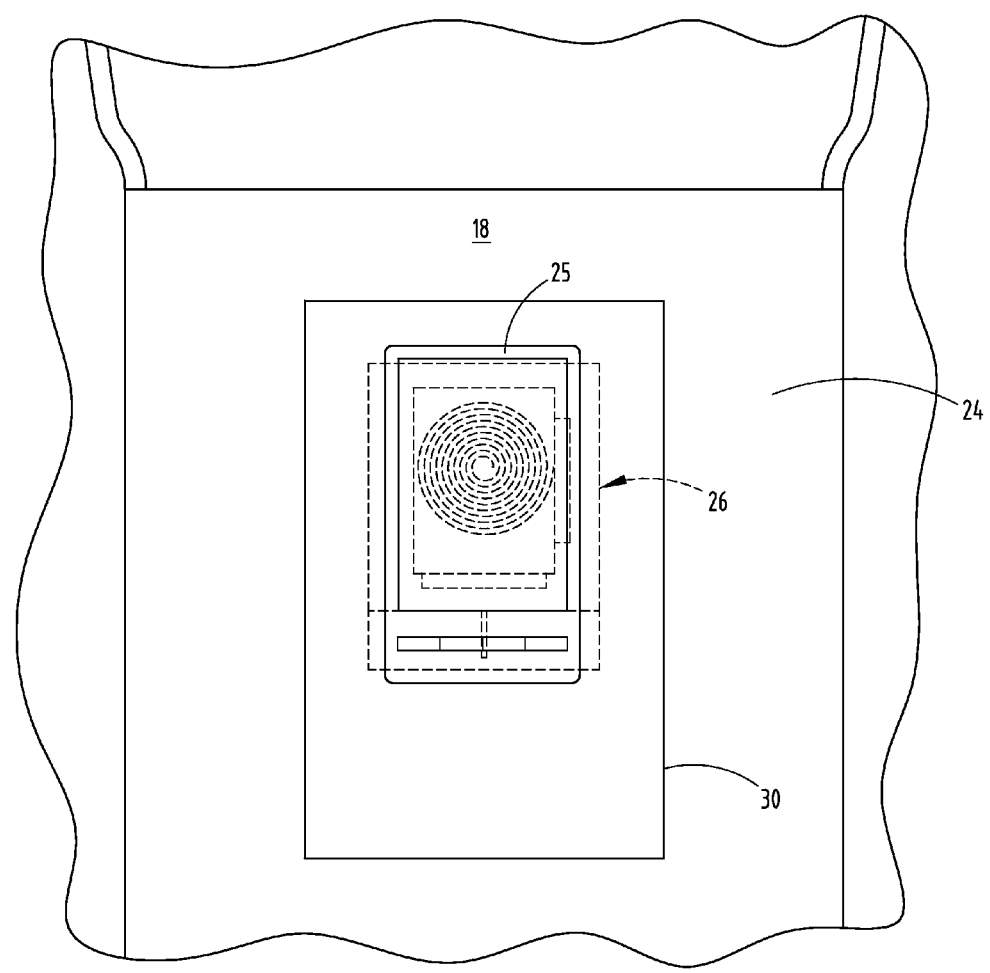
FIG. 2 is an enlarged top view of a portion of the vehicle cockpit further illustrating the charging region located on a center console of a vehicle with a portable chargeable device in proximity to the charger.

Referring to FIGS. 1 and 2, the interior of an automotive vehicle 10 is generally illustrated having a passenger compartment 12 employing a wireless charging system 30, according to one embodiment. The vehicle 10 generally includes a seating arrangement including a front driver seat 14 and front passenger seat 16, each adapted to seat a person as an occupant in passenger compartment 12 of the vehicle 10. The vehicle 10 also includes a center console 18 with storage compartment 22 disposed between front seats 14 and 16, and side door armrests 21. The center console 18, dashboard 20, and armrests 21, as well as other vehicle assemblies, may be equipped with various device holders such as trays and storage compartments that may receive one or more devices for wireless charging. The vehicle 10 may further include rear seating and wireless charging trays and storage compartments configured for wireless charging located in the rear seating area.

FIG. 2 illustrates an enlarged view of a portion of the interior of the automotive vehicle 10 containing a wireless charging system 30. In the embodiment shown, a charging region 24 may be located on the center console 18 of the vehicle 10 and a portable chargeable device 25 may be placed on the surface of the charging system 30. The vehicle 10 may be equipped with one or more wireless charging systems 30 for wirelessly charging one or more devices, including one or more rechargeable batteries providing electrical power within an electronic device. In the embodiment shown and described herein, the wireless charging system is an inductive charging system. It should be appreciated that other forms of wireless transmission may be employed in the wireless charging system such as magnetic resonance, loose coupled resonance and electromagnetic radiation according to other embodiments. In one embodiment, one or more wireless charging systems 30 may be provided in one or more storage trays or dedicated trays provided in center console 18 or other areas in the vehicle cockpit. The wireless charging system 30 includes a wireless charger 26, such as inductive charger according to one embodiment. Inductive chargers typically include one or more inductive coils for generating electric signals in the form of an electromagnetic field (EMF) typically at low frequencies (sub 500 kHz) within a charging region 24. In the embodiment shown, the charging region 24 may be defined by a tray or a storage compartment having a bottom wall and side walls for receiving a device, such that the device when located within the charging region 24 may be charged via the electromagnetic field through inductive coupling. According to another embodiment, the wireless charging system 30 may use a charging region 24 provided on one or more pads or trays provided in the vehicle dashboard 20. According to a further embodiment, the wireless charging system 30 may use a charging region 24 provided with a wireless charger 26 located in a tray within the armrest 21 extending from a vehicle door. In each of these embodiments, the wireless charging system 30 has a charging region 24 adapted to receive one or more devices, such as rechargeable batteries or electric powered or electronic devices 25 employing rechargeable batteries that may be charged via an electric signal on the charging region and may be accessible to the driver or other passengers within the cockpit 12 of vehicle 10. Examples of electronic devices 25 that may be charged by the charging system 30 include cell phones, tablets, cameras, Bluetooth ear pieces, portable radios, lighting devices, and music and video players.

Figure 3:
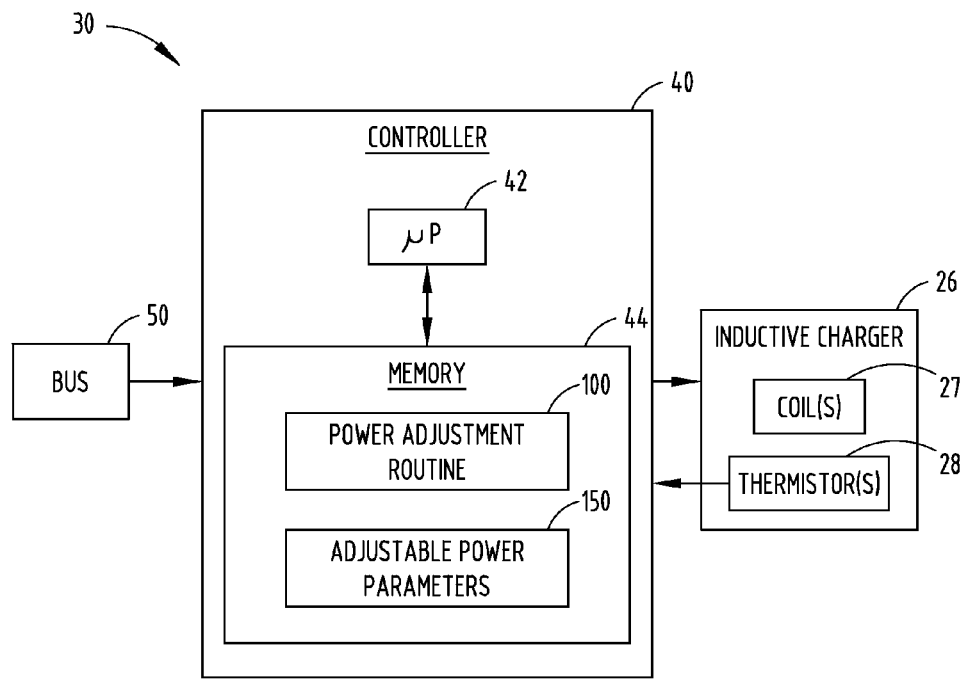
FIG. 3 is a block diagram of a wireless charging system, according to one embodiment.

Referring to FIG. 3, the wireless charging system 30 is further illustrated having control circuitry shown in one embodiment as a controller 40 including a microprocessor 42 and memory 44. The controller 40 may include other or additional analog and/or digital circuitry. Stored within memory 44 may be a power adjustment routine 100 and adjustable power parameters 150. The controller 40 may receive as inputs 1) a signal indicative of the current charger state 30 (e.g., on or off) and 2) information from a vehicle connectivity system via a network bus 50 related to at least one determination of a chargeable device 25 detected via wireless technology or a Universal Serial Bus (USB) port of the vehicle connectivity system. The information from the vehicle connectivity system may further include a request to determine if device 25 on wireless charging system 30 is chargeable, an indication of a potentially duplicated charging state such that suspending charging of system 30 may be required, and an indication that a measured environmental temperature and/or surface temperature of system 30 has exceeded an operating temperature of device 25. Detection of the potentially duplicate charging state and/or the measured temperature exceeding a certain temperature range may indicate that a device is being charged at thermal conditions that may potentially cause serious damage to the device battery as well as cause a failure of the device and/or charger 30 to operate effectively. Serious damage to the device battery may include leaking of chemicals and under certain high temperatures, such as above 140° F., the battery may crack, catch fire, or explode. Failure of the device to function effectively due to operating at excessive temperatures may include a suspension of charge, dimming of the display on device 25, decrease in signal strength, and disabling of the camera and hardware components on device 25.

The surface temperature of system 30 may be measured by one or more temperature sensing units (thermistors) 28 provided within wireless charger 26. The temperature sensing unit may sense both the temperature of the charger 26 and/or charging system 30 in order to approximate the temperature of device 25 during charging. Controller 40 receives as input from thermistor(s) 28 temperatures of the system and/or charger. Controller 40 then compares the determined temperature from the thermistor(s) 28 with either a manufacturer's specified allowable device 25 temperature value or a default value common to all class of portable devices, both which would be received from and stored/determined by the vehicle connectivity system (e.g. Ford Sync® Cell Phone and MP3 Player Connectivity system). Controller 40 may suspend or reduce the charging of device 25 if it determines that the thermistor(s) 28 temperature value is more than the allowable temperature limit reported by the vehicle connectivity system.

Figure 4:
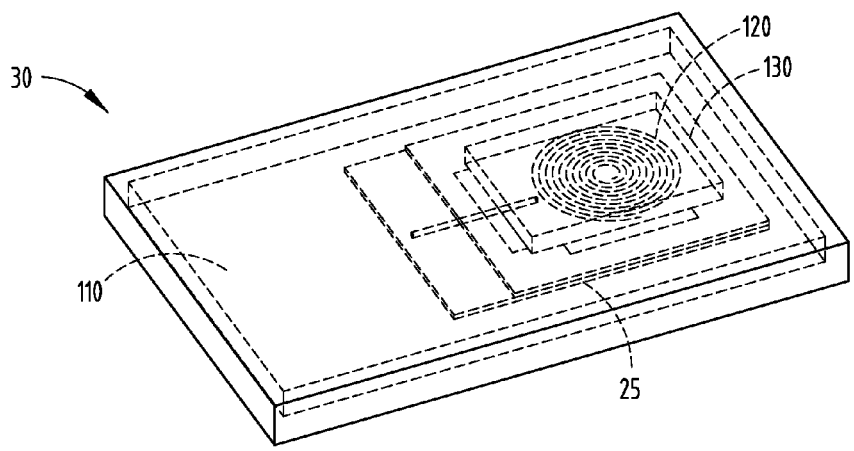
FIG. 4 is a perspective view of the wireless charging system, according to one embodiment.

FIG. 4 illustrates a possible implementation of wireless charging system 30 according to some embodiments. In FIG. 4, a transmitter section 110 may be housed in charging system 30. The transmitter section 110 may contain one or more transmitter coils (not shown) which may be coupled to a connector that is plugged into a standard external power source. A receiver 130 may be housed in chargeable electronic device 25. The transmitter section 110 may provide power to the receiver 130 such that the receiver 130 provides power to a rechargeable battery and the transmitter section 110 may receive additional control information from receiver 130 to adapt to a particular power transfer based on the control information.

The vehicle charging system 30 may include one or more wireless chargers for generating electric charging signals in a charger region 24 to charge electronic device 25 containing a rechargeable battery. The wireless charger may include a charger 26 generating an electromagnetic field. The charger may include one or more inductive coils 27 located below or on the bottom surface of the charger region 24 such as a pad for generating an electromagnetic field in the charger region 24. The electromagnetic field passes from inductive coils 27 into the charger region 24 and is intended to wirelessly couple to one or more inductive receiver coils 120 provided in the portable electronic device 25 so as to transfer electrical energy thereto for purposes of charging one or more rechargeable batteries. As a result, an electromagnetic field is present within the charger region 24.

Figure 5:
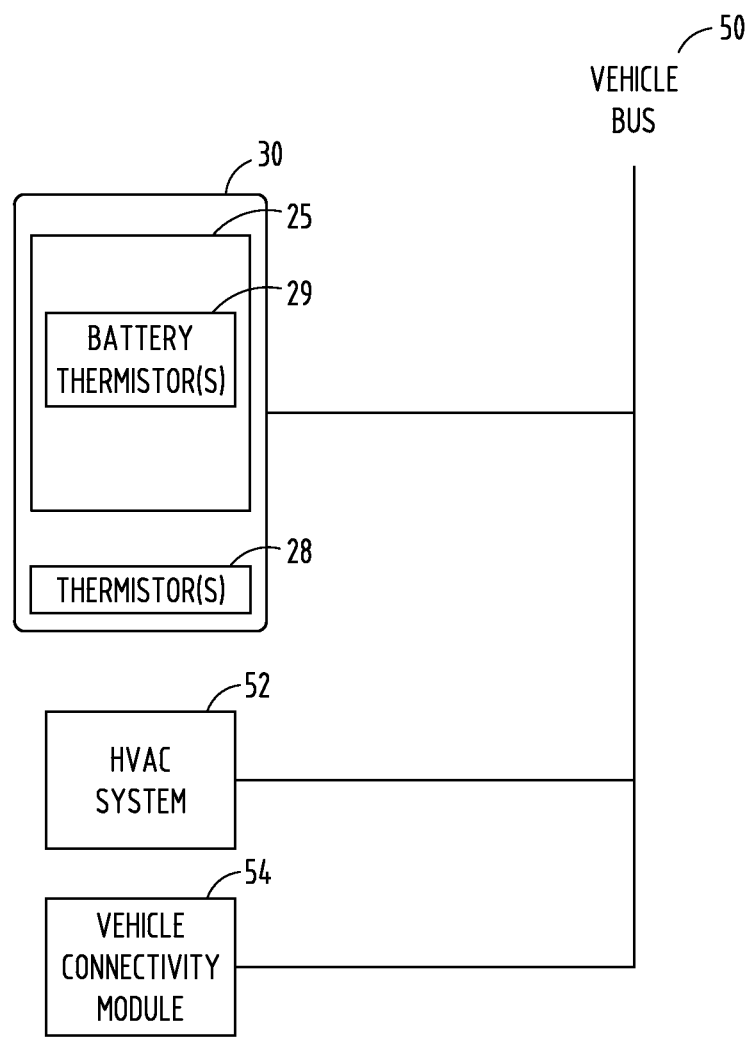

FIG. 5 shows a schematic illustration depicting one embodiment of an adaptable wireless communication system including a network connection between wireless charging system 30 and an integrated vehicle system including features such as a heating ventilation air condition (HVAC) system 52 and vehicle connectivity module 54 (e.g. Ford Sync® Cell Phone and MP3 Player Connectivity system). Charging system 30 may interface with a plurality of networks via a vehicle bus 50 such as a privately accessible network such as WAN (Wide Area Network)/LAN (Local Areas Network), publicly accessible networks such as the Internet, in-vehicle networks such as controller area networks (CAN) and assembly line data link (ALDL). When the charging system 30 is connected to an in-vehicle data bus 50, the controller 40 in wireless system 30 may accept incoming information from the vehicle connectivity module 54 that is connected to the in-vehicle data network and in communication with the HVAC system 52. Such incoming information from the vehicle connectivity module 54 may include information related to at least one determination of a chargeable device, status information such as detection of a duplicate charging state, and temperature information sensed by HVAC system 52 and/or calculated by system 30. In addition, when connected to an in-vehicle data network, the controller 40 may monitor the incoming operation mode information from the vehicle connectivity module 54, other vehicle electronic devices and systems connected to the network (not shown) and temperature information of system 30. Depending on the information detected by controller 40, the controller 40 may issue commands modifying the amount of power used by charger 26 to charge the rechargeable battery or battery of portable device 25 by adjusting the electrical charging signal generated by charger 26.

As shown in one embodiment in FIG. 5, chargeable device 25 may include at least one battery thermistor(s) 29, which may be positioned either in the device battery or in proximity to the battery. The thermistor(s) 29 may sense a battery temperature and to confirm a temperature of the battery is within a safe operating range before charging the battery. A safe operating temperature range is generally 0° C. to 45° C. though the range will vary depending on the type of device and battery unit. While a high thermistor(s) 29 value may cause the device 25 to stop accepting charge if the sensed battery temperature is beyond a calculated temperature range, thereby reducing charging at unsafe thermal conditions, the microcontroller of device 25 may not be able to communicate with wireless system 30 directly regarding sensed temperature data. In order to suspend or reduce wireless charging of device 25 by system 30 when excessive thermal conditions are detected, thermistor(s) 28 is included within inductive charging system 30. By sensing both the temperature of the inductive charger 26 and/or inductive charging system 30, the thermistor(s) 28 provides an approximation for the surface temperature of the wireless system during charging. In addition, controller 40 may receive determined temperature information from thermistor(s) 28 and compare the temperature reading with a device temperature value received from and determined by the vehicle connectivity system specifically for manufacturers' model of device 25. Controller 40 may then suspend or reduce the charging of device 25 if it determines that the sensed thermistor(s) 28 temperature is more than the temperature value determined by the vehicle connectivity system or, alternately, by using a default temperature value stored in the charger unit.

The HVAC system 52 within vehicle 10 may include an electronic climate controller and an electromechanical climate control system. The climate control system generally includes an evaporator, condenser, compressor and other items known in the art to heat and cool the vehicle cabin. The climate controller is generally configured to control the operation of the climate control system (e.g., heating/cooling of the interior of the vehicle). The climate control system is operatively coupled to the climate controller. The climate controller may be implemented as a climate control head positioned on an instrument panel of the vehicle. The climate controller may include a plurality of input switches for user selection to select climate control options. Such options may include setting desired temperatures for a given zone(s) in the vehicle, selecting between panel, floor, and front window defrost modes, rear window defrost, selecting blend modes between heated and cooled air, recirculation of cabin air, and selecting blower speeds for distributing air throughout the cabin of the vehicle.

The HVAC system 52 may be adapted for use in a manual temperature control system or in an electronic temperature control (ETC) system. A rear climate control system (not shown) may also be coupled to the HVAC system 52. In general, rear climate control system provides conditioned heated or cooled air for passengers seated in the rear of the vehicle. The rear climate control system may be implemented for minivans, sport utility vehicles or other such vehicles generally recognized to utilize such a system or occupants seated proximate to the rear of the vehicle.

Climate control seats 14 and 16 may optionally be coupled to the climate controller of the HVAC system 52. Such seats 14 and 16 may be heated and/or cooled seats. In one example, the climate control seats 14 and 16 may include a heated seat module or climate control seat module that is responsive to the climate controller of system 52. One or more switches may be coupled to the climate controller to allow occupants to control the operation of the heated and/or cooled seats. In such a case, climate controller may transmit control signals over the data bus to the climate control seat module and/or the heated seat module to control the heated seat and cooled seat operation. In another example, the switches may be directly coupled to the heated and/or climate control seat module to allow occupants to heat or cool seats accordingly. The climate controller may also be coupled to a heated steering wheel controller (not shown) for controlling the warm of the steering wheel.

HVAC system 52 may be coupled to a plurality of sensing mechanisms (not shown) for monitoring temperature conditions both within and outside the vehicle. For example, an ambient temperature sensor may be coupled to the climate controller for providing temperature of the atmosphere exterior to the vehicle (or the ambient temperature) and an in-car temperature sensor may be coupled to climate controller for providing cabin temperature (or in-car temperature) of the vehicle. The climate controller monitors the ECT, the ambient temperature, and the cabin temperature sensed by the sensing mechanisms to determine a corresponding speed for driving blowers within the climate control system. For example, the in-car temperature sensor may provide an input signal to the climate controller for automatic temperature level control of air existing in a duct into the vehicle's compartment. Preferably, the in-car temperature sensor is operative disposed within the instrument panel, such that the sensor can sense the air temperature condition within the occupant compartment. The in-car temperature sensor senses the temperature of the cabin air, and sends an output signal to the HVAC system 52 representative of the air temperature. The climate controller within system 52 processes the cabin temperature information and other inputs (e.g., ECT, ambient temperature information) and provides an output signal to the climate control system within system 52 to operatively control the temperature of the conditioned air, distribution of air, and air flow rate to the occupant compartment, at the desired comfort level.

The ECT, the ambient temperatures, the cabin temperature and the blower speed may vary based on the type of vehicle used and content within such a vehicle. The values for ECT, the ambient temperatures, the cabin temperature and the blower speed may vary based on the desired criteria of a particular implementation. The desired temperature or temperature range may be indicated via a user interface that may include analog, digital, and/or voice activated controls. The desired temperature specified by the vehicle occupant(s) may be a specific value, i.e., warm, hot, cool, etc. A temperature range may be converted by the user interface or system controller to a corresponding value that may vary depending upon the current operating conditions. For example, a temperature range of "cool" may initiate air conditioning when outside ambient temperature is above a certain threshold, but initiate heating with low blower speed when the outside ambient temperature is below a corresponding threshold. The HVAC system 52 may include other component parts, such as sensors, valve and switches, which are conventional and known in the art to operatively transfer, condition and distribute the air flow.

The climate controller of the HVAC system 52 may periodically transmit the ambient temperature and cabin temperature information to the vehicle connectivity module 54 via bus 50 in response to detection of a vehicle engine and vehicle connectivity module 54 being activated. In another embodiment, the climate controller of the HVAC system 52 may begin to periodically transmit information pertaining to the ambient temperature and cabin temperature via bus 50 to the vehicle connectivity module 54 in response to device 25 being detected as chargeable by the vehicle connectivity module 54 or by the wireless charging system 30. In another embodiment, once the vehicle connectivity module 54 has been activated, system 54 may periodically send a message via bus 50 to the controller of HVAC system 52 requesting ambient temperature and cabin temperature information. The controller 40 may then respond by outputting the requested temperature information to the vehicle connectivity module 54 via bus 50.

In a further embodiment, systems within the vehicle need not communicate with one another directly by event-driven messages in order to receive information from each other. Instead, in vehicle systems that may periodically transmit updated information on in-vehicle network such as the CAN network and any system connected to the network that needs such information, it would be read directly off the network when needed. For example, system 52 may update temperature information periodically, for example every 10 or 20 milliseconds, on the CAN network via bus 50 and when the controller 40 or vehicle connectivity module 54 needs to process such information, the controller 40 or system 54 would read the most recently updated information from the CAN network directly without communicating with system 52.

Vehicle connectivity module 54 may maintain a database of chargeable devices with temperature metrics pertinent to each device included in the database. Such temperature metrics may include storage, operating and/or charging range of temperatures that the device and/or battery of the device is designed to operate based on data from the device manufacturer or limits chosen by the automotive OEM that specifies functional requirements for the vehicle connectivity module 54. The chargeable devices included in the database may include devices directly compatible with vehicle connectivity module 54. Such direct compatibility between device 25 and system 54 may include recognition that device 25 is chargeable by the vehicle connectivity module 54 through a wired or wireless connection and reporting/displaying to the occupant of the vehicle the information about the device 25 stored in the database of system 54 after such recognition. Such reported/displayed information to the occupant inside the vehicle may include a model number of the device, indication that the device is connected and/or the battery level of the device as measured by the vehicle connectivity module 54 or another module coupled to system 54.

Vehicle connectivity module 54 may also maintain a database of temperature metrics pertaining to devices that are not recognized as compatible with the connectivity system 54 but are identified as chargeable by wireless charging system 30. Despite not being charged by connectivity system 54, device 25 may be charged at excessive thermal conditions by charger 26 of wireless system 30. Recording of temperature metrics for such devices enables mitigation of charging of device 25 at excessive thermal conditions by charger 26.

Vehicle connectivity module 54 may also have additional functions for reducing charging of device 25 at unsafe thermal conditions including preventing simultaneous charging of device 25 by the connectivity system 54 and wireless charging system 30 and monitoring both the cabin temperature sensed by HVAC system 52 and the surface temperature of inductive charging system 30 as approximated by thermistor(s) 28 within system 30. Such additional functions will be explained in detail below with reference to accompanying FIGS. 6-9.

In another embodiment, connectivity module 54 and controller 40 may monitor excessive thermal conditions at a faster duty cycle when the vehicle engine is detected as on and a slower duty cycle when the vehicle engine is detected as off. Such a configuration would reduce power consumption of the vehicle battery when the engine is not on and will be explained in detail below with reference to accompanying FIG. 6. The vehicle connectivity module may also provide additional in-vehicle functions besides temperature monitoring such as providing hands-free audio assistance, communicating with an MP3 player to play music, as well as other multimedia and entertainment functions. An example of a vehicle connectivity module is Ford Motor Company's SYNC® technology, which may be equipped onto Ford's vehicles.

Figure 6:
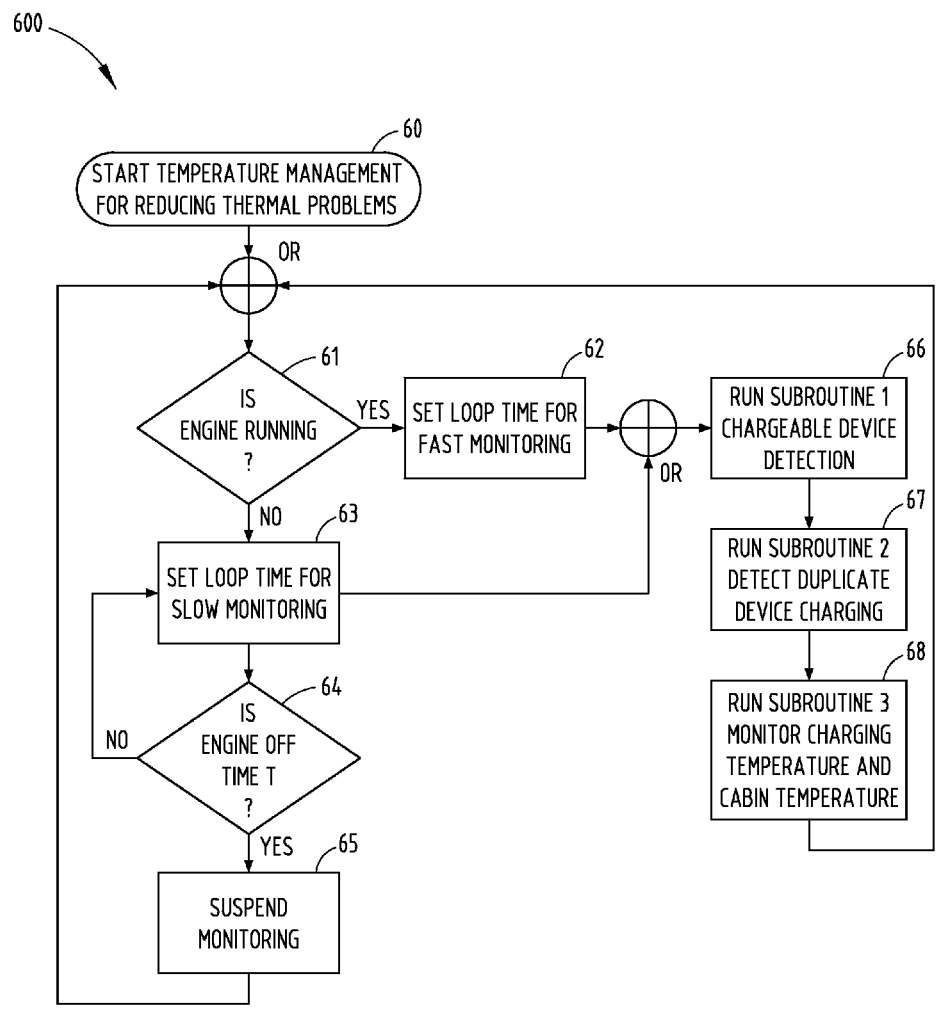
FIG. 6 is a flow diagram illustrating temperature management in an inductive charging system, according to one embodiment.

FIG. 6 is a flow chart 600 illustrating temperature management for reducing thermal problems. After initialization 60 of process 600, a vehicle access and start module (not shown) within the vehicle 10 proceeds to step 61 to determine if the vehicle engine is running. In step 61, the vehicle access and start module may determine that the engine is running by determining that a vehicle alternator is replenishing a main vehicle battery. If in step 61, vehicle access and start module determines that the engine is running, the module advances to step 62 to set a loop time of process 600 to fast monitoring. In step 62, setting a fast monitoring loop time may enable controller 40, connectivity system 54, and/or other modules within the vehicle to iterate subroutines (steps 66-68) within the temperature management process at a fast rate (e.g., every 100-200 milliseconds). If in step 61, vehicle access and start module determines the engine is not running (e.g., the vehicle alternator is not replenishing the main vehicle battery), the module advances to step 63 setting the loop time of process 600 to slow monitoring. In step 63, setting a slow monitoring loop time may enable controller 40, connectivity system 54, and/or other modules within the vehicle to iterate the subroutines (steps 66-68) of the temperature management process at a slower duty cycle (e.g. every 10-60 seconds). Providing a slower duty cycle for the measuring of excessive thermal conditions when the engine is shut off would reduce power consumption of the vehicle battery while the engine is shut off, thereby prolonging a vehicle battery state of charge sufficient to re-start the vehicle.

After processing step 63, the vehicle access and start module proceeds to step 64 to determine if the engine has been detected OFF for a predetermined amount of time, T (e.g., 60 minutes). If the engine has not been detected OFF for the predetermined amount of time, the process then loops back to step 63 continuing to keep the loop time for slow monitoring. If in step 64, the engine has been detected OFF for the predetermined amount of time, process proceeds to step 65 to suspend monitoring and loop back to step 61 to determine if the engine is running. Once either a loop time for fast monitoring or for slow monitoring is selected, temperature management process 60 proceeds sequentially from subroutine 66 to subroutine 68, monitoring the charging temperature and cabin temperature. After processing step 68, process 600 loops back to step 61 to determine if the vehicle engine is running.

Figure 7:
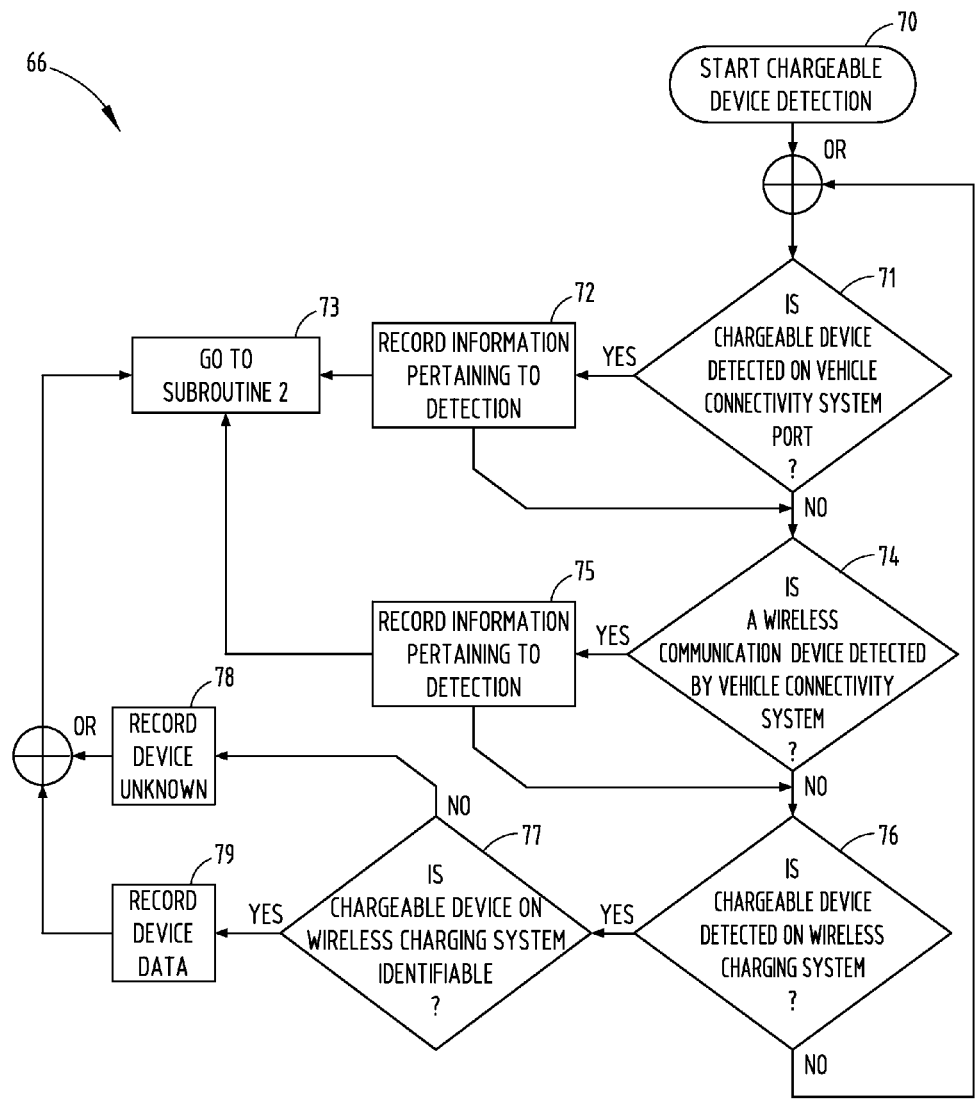
FIG. 7 is flow diagram illustrating a chargeable device detection routine, according to one embodiment.

Referring to FIG. 7, subroutine 66 for chargeable device detection is initiated in step 70 after a loop time for fast or slow monitoring is determined in FIG. 6. Subroutine 66 performs the task of creating a database of compatible devices as well as adding additional temperature information to devices already stored in the database. After initialization of subroutine 66, a vehicle connectivity system 54 detects if the chargeable device 25 is interfaced with the vehicle connectivity system 54 via a connectivity port in step 71. Example connectivity ports include USB, SCSI, Serial, Parallel, and IEE 1394. In step 71, system 54 may periodically send a message to the connectivity port until a response is received indicating a chargeable device 25 is interfaced with the vehicle connectivity system 54. If the chargeable device 25 is detected as compatible with the vehicle connectivity port, vehicle connectivity system 54 proceeds to step 72. As noted above, vehicle connectivity system 54 may have a pre-stored database of compatible chargeable devices with associated metrics and rules for each compatible device in the database. In step 72, system 54 may record updated information pertaining to the detection of the device found in the pre-stored database. Such information may include update of the device model, device name as well as temperature metrics that the device and/or device battery is designed to operate within such as ranges for storage, operating, and/or charging temperatures.

If in step 71, the chargeable device is not detected on the vehicle connectivity port, system 54 proceeds to step 74 to determine if a chargeable device can be identified over a wireless communication protocol used by the device for it to interact with the vehicle connectivity system 54. Examples of wireless communication protocols that may be used by a chargeable device and compatible with vehicle connectivity system 54 include Bluetooth, Infrared, 2-way UHF key fobs, and IEEE 802.11 technologies. If a wireless communication technology is detected by system 54, system 54 may use the wireless link to record updated information pertaining to the detected device found in the pre-stored database. Such information may include update of the device model, device name as well as temperature metrics that the device and/or device battery is designed to operate within such as ranges for storage, operating, and/or charging temperatures. Following updating the information pertaining to the compatible device in step 75, system 54 proceeds to subroutine 2 (detection of duplicate device charging) in step 73.

If in step 74, no wireless communication enabled device is detected by system 54, system 54 proceeds to step 76 to query controller 40 of wireless charging system 30 to determine if the device 25 detected by system 30 is capable of being inductively charged by system 30. If in step 76, controller 40 determines these conditions have been met, it sends a response to system 54 indicating device 25 is capable of being inductively charged and controller 40 proceeds to step 77. If not, controller 40 communicates to system 54 that no compatible detected device is found on wireless charging system and vehicle connectivity system 54 loops back to step 71 to determine if a chargeable device is detected on the vehicle connectivity port.

In step 77, controller 40 sends detected device information (such as connectivity metrics associated with the device 25) to system 54 which determines, if based on the device information, the device model and/or device name can be identified. Identification in step 77 may be achieved by comparing the stored database of device metrics compatible to system 54 with the device information detected in step 76 and sifting through the database of device metrics to match such information with the detected device information. When a match is found, system 54 proceeds to step 79 wherein device data corresponding to the model found in the vehicle database may be further updated to include temperature metrics of the device. If the chargeable device is not identifiable in step 77, the device is recorded as unknown in step 78. A determination that the chargeable device is detected by inductive charging unit 30 and identified by system 54 may indicate that the receiver circuit of the device 25 is integrated into the device or an inductive charging protocol sleeve placed on the device is known to be unique to the particular device. A determination that the detected chargeable device is not identifiable in step 77 may indicate that the receiver circuit of device 25 is part of a generic inductive charging protocol sleeve or adhesive slap-on device such that a specific device model associated with the generic sleeve or slap-on receiver cannot be identified. After the detected chargeable device is updated in the database (step 79) or recorded as unknown (step 78), system 54 proceeds to subroutine 2 of routine 66 (detection of duplicate charging).

Figure 8:
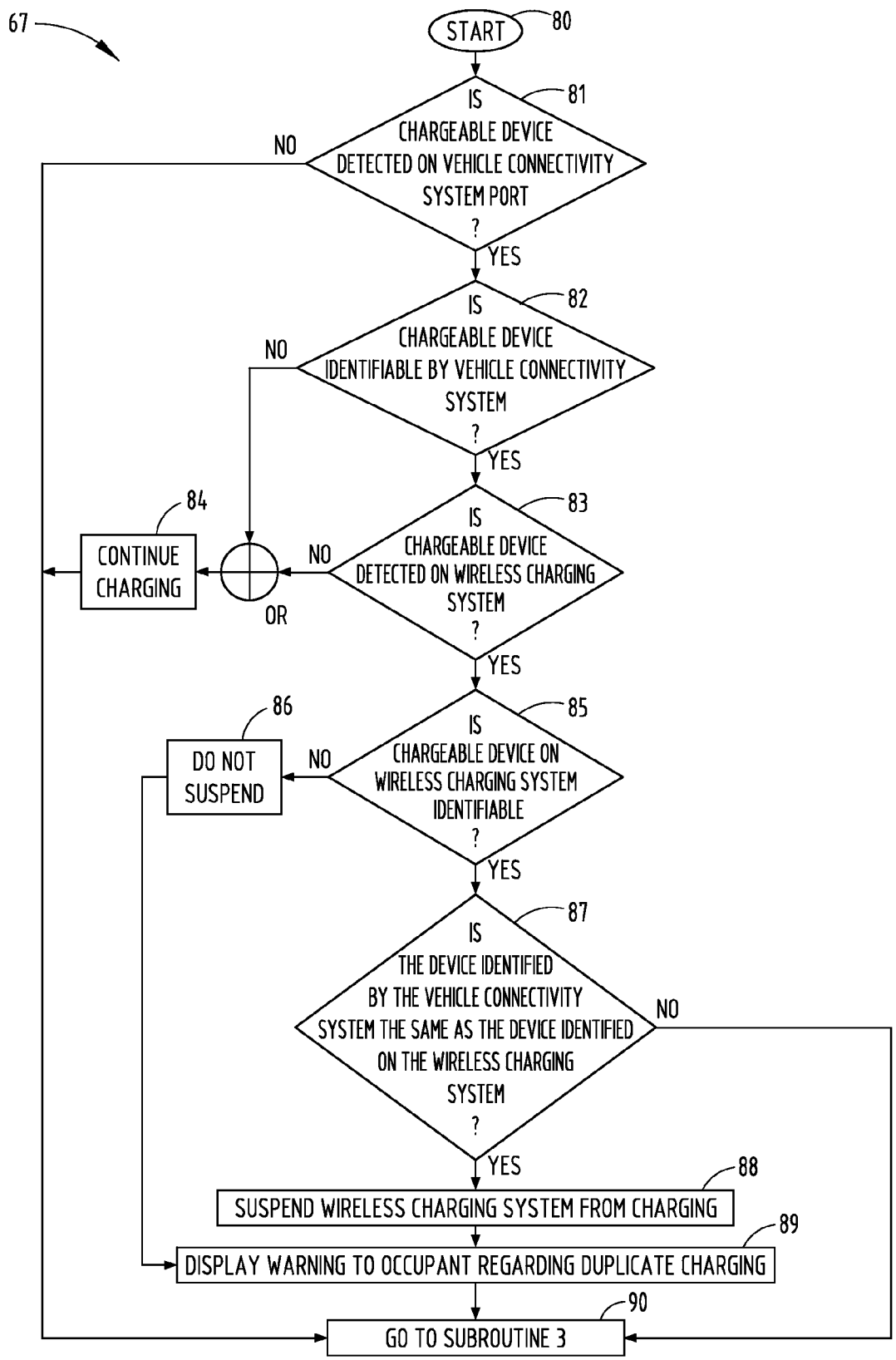
FIG. 8 is a flow diagram illustrating detection of a duplicate device charging routine, according to one embodiment.

Referring to FIG. 8, subroutine 67 detection of duplicate device charging is initiated in step 80 after processing subroutine 1, chargeable device detection. Subroutine 67 performs the task of preventing simultaneous charging of device 25 by the connectivity system 54 and wireless charging system 30 in order to reduce the risk of serious damage to the device battery or device because of excessive heating. Serious damage to the device battery may include leaking of chemicals and under certain high temperatures, such as above 140° F., the battery may crack, catch fire, or explode. Failure of the device to function effectively due to operating at excessive temperatures may include a suspension of charge, dimming of the display of device 25, decrease in signal strength, and disabling of the camera and hardware components.

After initialization of subroutine 67, vehicle connectivity system 54 detects if the chargeable device 25 is interfaced with the vehicle connectivity system 54 via a wired connectivity port in step 81. As noted above, system 54 may periodically send a message to the connectivity port until a response is received indicating a chargeable device 25 is interfaced with the vehicle connectivity system 54.

If the chargeable device 25 is detected as compatible with the vehicle connectivity port, vehicle connectivity system 54 proceeds to step 82. If the chargeable device is not detected on vehicle connectivity port, system 54 proceeds to subroutine 3 (monitoring charging temperature and cabin temperature) in step 90. In step 82, system 54 determines, if based on the detected device information (such as connectivity metrics associated with device 25), the device model and/or device name can be identified in the system database. Identification in step 82 may be achieved by comparing the stored database of device metrics compatible to system 54 with the device information detected in step 81 and matching the stored device metrics with the detected device information.

If the chargeable device is identifiable, system 54 proceeds to step 83 to query controller 40 of wireless charging system 30 to determine if system 30 detects a device capable of being inductively charged by system 30. If in step 83, controller 40 determines these conditions have been met, it sends a response to system 54 indicating device 25 is capable of being inductively charged and controller 40 proceeds to step 85. If not, controller 40 communicates to system 54 that no detected device is found on the wireless charging system. If either the chargeable device is not identifiable by system 54 or chargeable device is not detected on system 30, vehicle connectivity system 54 proceeds to step 84 and continues charging.

In step 85, controller 40 sends detected device information (such as connectivity metrics associated with the device 25) to system 54 which determines, if based on the device information, the device model and/or device name can be identified in the system database. Identification in step 85 may be achieved by comparing the stored database of device metrics compatible to system 54 with the device information detected in step 76 and matching the stored device metrics with the detected device information. When there is a match found, system 54 proceeds to step 87 and determines if the device identified by the vehicle connectivity system is the same as the device identified on the wireless charging system. If the two devices are the same in step 87, then controller 40 suspends wireless charging system 30 from charging in step 88 and a warning is displayed to occupant regarding duplicate charging in step 89. This indicates that the one device is being charged simultaneously by both the wireless charging system and connectivity system such that suspending the wireless system 30 from charging is necessary in order to prevent damage to the device and/or device battery. An example of such a warning that may be displayed to occupant of the vehicle may be "WARNING: Connecting USB Cable to Device when Charging on Wireless Charger may DAMAGE DEVICE." The warning indication of duplicate charging may be disposed upon charging region 24 and/or elsewhere in charging system 30 or the vehicle.

However if the chargeable device on wireless charging system is identifiable, controller 40 does not suspend system 30 from charging (step 86) but a warning to occupant regarding the possibility of duplicate charging is provided (step 89). This may indicate that the devices are likely to not be the same device being charged (e.g., a driver side device and passenger side device), but that a warning may still be necessary to make the occupant aware of the possibility and dangers of simultaneous charging. Lastly, system 30 does not need suspension of charge nor a warning of duplicate charging (step 84) if the chargeable device is detected on the vehicle connectivity port but not identifiable by connectivity system in step 82 or the device is identifiable by system 54 but not detected by wireless system 30 in step 83. This would indicate a lack of detection of more than one device being charged on two systems and thus, a lack of simultaneous charging of device 25. If the two devices identified as being charged by system 30 and connectivity system 54 are not the same device or the warning is displayed in step 89, the system 54 proceeds to subroutine 3, monitoring charging temperature and cabin temperature (step 90).

Figure 9A:
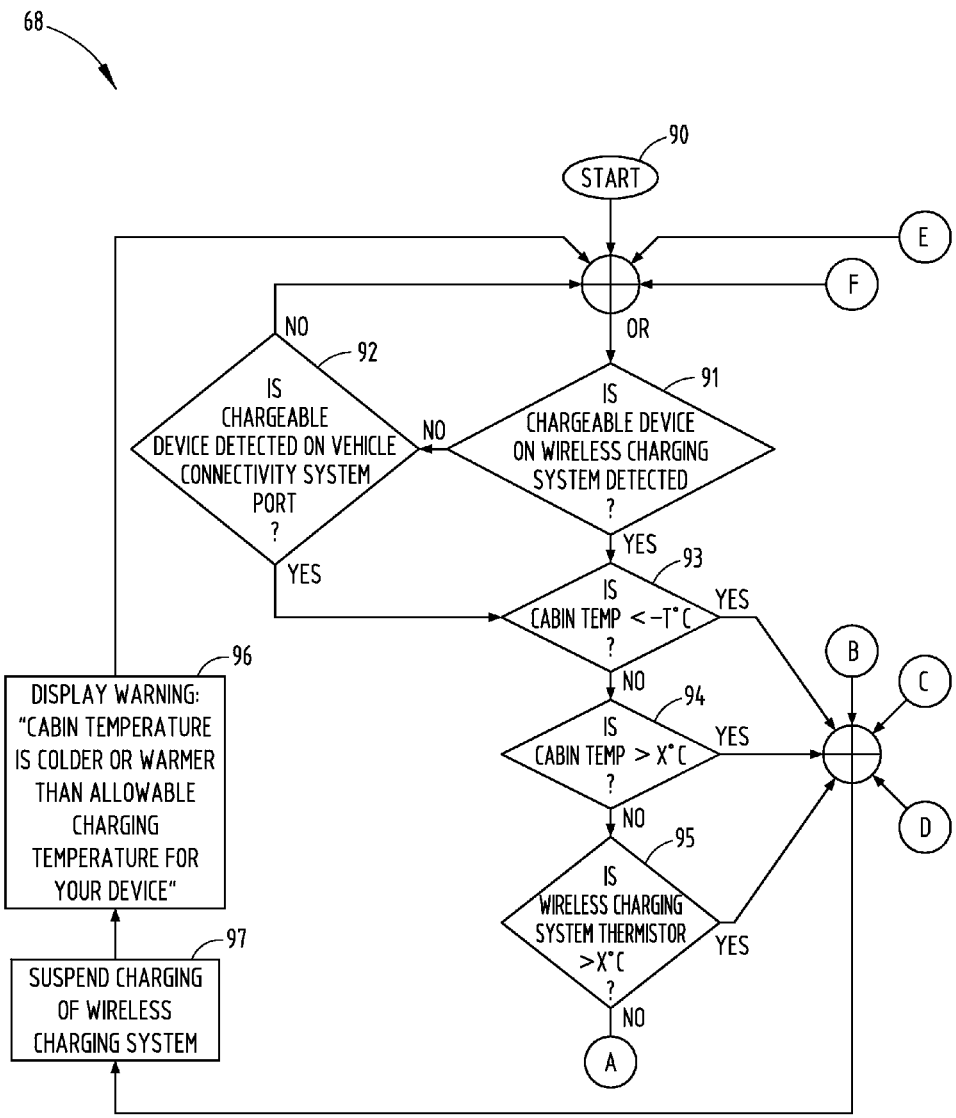
FIGS. 9A and 9B are a flow diagram illustrating monitoring of charging temperature and cabin temperature, according to one embodiment.
Figure 9B:
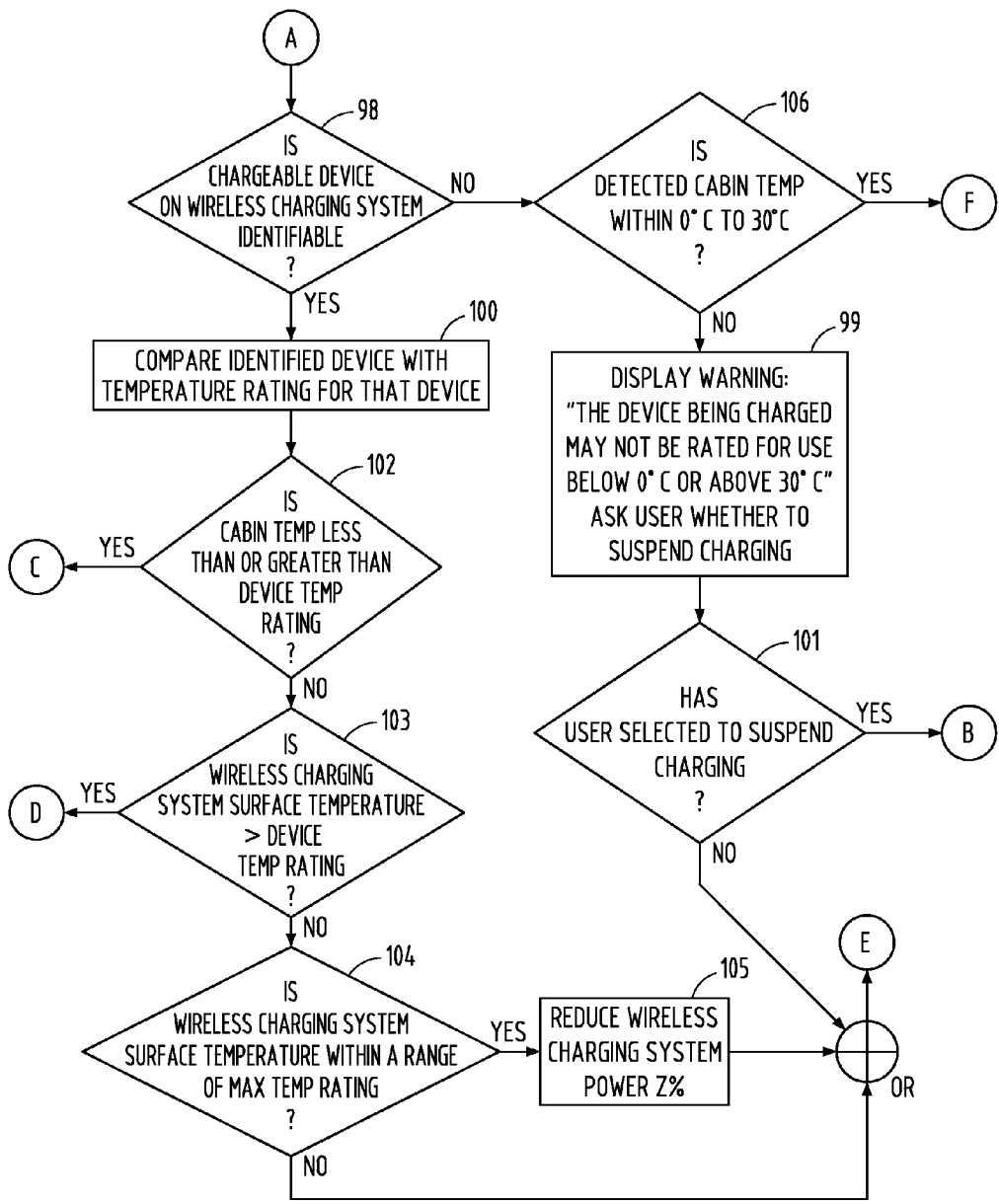

Referring to FIG. 9A, subroutine 68 monitoring charging temperature and cabin temperature is initiated in step 90 after processing subroutine 2, detecting duplicate charging. Subroutine 68 performs the task of monitoring charging temperature and cabin temperature during wireless charging of device 25 in order to reduce the risk of charging at unsafe thermal conditions. After initialization of subroutine 3 (step 90), system 54 proceeds to step 91 to query controller 40 of wireless charging system 30 to determine if system 30 detects a device capable of being inductively charged by system 30. If in step 91, controller 40 determines these conditions have been met, it sends a response to system 54 indicating device 25 is capable of being inductively charged and system 54 proceeds to step 93. If not, controller 40 communicates to system 54 that no detected wireless device is found and system 54 proceeds to determine if the chargeable device is detected on vehicle connectivity system port (step 92) using the same procedure as discussed above in steps 71 or 81 of FIGS. 7 and 8, respectively.

If the chargeable device is detected on either vehicle connectivity system port or the wireless charging system 30, system 54 proceeds to step 93 to communicate with the HVAC system 52, as explained previously in reference to FIG. 5. In step 93, system 54 receives temperature information sensed by the HVAC in-car temperature sensors (i.e., cabin temperature) and compares such information with a temperature, $-T$ degrees Celsius. $-T$ degrees Celsius may be based upon temperature metrics recorded for a particular detected device 25 in steps 72 or 75 and/or based upon a pre-set allowable minimum temperature that devices can be charged inside the vehicle. System 54 advances to determine if the cabin temperature is greater than X degrees Celsius in step 94, if it is determined that the cabin temperature is not less than $-T$ in step 93. System 54 advances to step 95 to determine if the temperature calculated from the thermistor 28 of system 30 during inductive charging of device 25 is greater than temperature X, if it is determined that cabin temperature is not greater than X degrees Celsius in step 94. X degrees Celsius may be based upon temperature metrics recorded for a particular detected device 25 in steps 72 or 75 and/or based upon a pre-set allowable maximum temperature that devices can be charged inside the vehicle. If it is detected that the cabin temperature is less than $-T$ degrees Celsius (step 93) or the cabin temperature is greater than X degrees Celsius (step 94) or the surface temperature calculated on charging system 30 is greater than X degrees Celsius (step 95), system 54 proceeds to step 97 to suspend wireless charging of wireless charging system 97 and to display a warning of potentially charging at excessive temperature conditions, such as: "Cabin temperature is colder or warmer than allowable charging temperature for your device."

If the surface temperature of wireless charging system 30 during charging is not greater than X degrees Celsius, controller 40 indicates this status to system 54 and then proceeds to step 98 to determine if the chargeable device on wireless charging system is identifiable. An example of the identification procedure is explained above in reference to steps 77 and 82 of FIGS. 7 and 8, respectively.

Vehicle connectivity system 54 then proceeds to match the identified device with a particular temperature rating (e.g., temperature range that the device is designed to operate) stored for that device in the device database of connectivity system 54, if the chargeable device is identifiable in step 98. It should be noted that the temperature rating may have been recorded during subroutine 2 in step 79. System 54 then proceeds to determine if the cabin temperature sensed by the HVAC system 52 is less than or greater than the device temperature rating. If not, system 54 proceeds to step 103, sending the temperature rating to controller 40 which determines if the detected surface temperature of the wireless charging system 30 is greater than the device temperature rating. If not, then controller 40 proceeds to step 104 to determine if the detected surface temperature of system 30 is within a potentially hazardous temperature range (e.g., 20° C.) of the maximum of the temperature rating of the device. If yes, controller 40 reduces the charging power of system 30 by a certain percentage Z, such as, for example 50%.

If the chargeable device is not identifiable yet detected as in step 98, system 54 proceeds to step 106 to determine if the detected cabin temperature is within a predetermined temperature range such as 0 to 30° C. If the cabin temperature is determined to be within the predetermined temperature range, system 54 loops back to step 91 of subroutine 3 to determine if a device on the wireless charging system has been detected. If the cabin temperature is not within the predetermined range, a generic warning may be displayed in step 99 in order to give the occupant of the vehicle notice that charging at temperature extremes can be damaging and subsequently system 54 asks the occupant of the vehicle whether to suspend charging or not. An example of a display warning may be: "The device being charged may not be rated for use below 0° C. and above 30° C." System 54 may then proceed to determine if the occupant of the vehicle has selected whether to suspend charging or not in step 101. If the user selects NO in step 101 or the wireless charging system surface temperature is not within a potentially damaging temperature range that the device is supposed to operate under in step 104, the system 54 loops back to step 91 of subroutine 3. If the cabin temperature is less than or greater than the device temperature rating in step 102 or the wireless charging system surface temperature is greater than the device temperature rating in step 103 or the occupant of the vehicle has selected to suspend charging when cabin is outside a pre-set temperature range in step 101, system 54 proceeds to step 97 and communicates with controller 40 to suspend inductive charging of device 25 and displays the warning of "Cabin temperature is colder or warmer than allowable charging temperature for your device" in step 96. System 54 then loops back to step 91 of subroutine 3.

Accordingly, the vehicle connectivity system 54 in combination with inductive charging system 30 advantageously reduces or prohibits charging of devices at excessive thermal conditions within a vehicle. This advantageously prevents serious damage to the device battery or malfunction of the device because of charging at extreme temperatures. The wireless charging system 30 is particularly well suited for use on a vehicle where there are many electronic devices that may operate on a similar frequency band as the wireless system. However, the system may be useful for other applications. It should be appreciated that when the object is no longer detected as being charged at unsafe temperatures, the wireless charging may be increased and resumed.

It is to be understood that variations and modifications can be made on the aforementioned structure without departing from the concepts of the present invention, and further it is to be understood that such concepts are intended to be covered by the following claims unless these claims by their language expressly state otherwise.

We claim:

1. A method for reducing thermal conditions in a wireless charging system, the method comprising:
   detecting a chargeable device via at least one of a vehicle connectivity system and a wireless charging protocol;
   wirelessly charging the chargeable device with a wireless charger;
   detecting temperature information related to said wireless charging; and
   adjusting an amount of power provided to the chargeable device by the charger based on the detected temperature information.

2. The method of claim 1 further comprising the step of storing temperature metrics related to at least one chargeable device in a database.

3. The method of claim 2 further comprising the step of identifying the chargeable device by at least one temperature metric of the chargeable device stored in the database.

4. The method of claim 3, wherein said at least one temperature metric is an operating range of temperature for the chargeable device.

5. The method of claim 1 further comprising comparing the detected temperature information with a determined temperature metric of the chargeable device.

6. The method of claim 1 further comprising determining cabin temperature inside a vehicle and comparing the cabin temperature with a determined temperature metric of the chargeable device.

7. The method of claim 1 further comprising the step of suspending power provided to the chargeable device by the charger if the chargeable device is detected as proximate to or on a surface of a wirelessly powered module and identified as a chargeable device by a vehicle connectivity system.

8. The method of claim 1 further comprising displaying a warning to a user about charging the chargeable device at an excessive thermal condition.

9. A wireless charging system comprising:
   a wirelessly powered charger;
   a chargeable device;
   a controller that detects temperature information related to the wirelessly powered charger, and adjusts an amount of power provided to the chargeable device by the charger based on the detected temperature information; and
   a vehicle connectivity system configured to suspend power provided to the chargeable device by the charger if the chargeable device is detected proximate to a wirelessly powered, module and identified as a chargeable device by the vehicle connectivity system.

10. The charging system of claim 9 further comprising a connectivity system that stores temperature metrics related to at least one chargeable device in a database.

11. The charging system of claim 10, wherein the chargeable device is identified by at least one temperature metric of the chargeable device stored in the database.

12. The charging system of claim 11, wherein said at least one temperature metric is an operating range of temperature for the chargeable device.

13. The charging system of claim 10, wherein the connectivity system further determines cabin temperature inside a vehicle and compares the cabin temperature with a determined temperature metric of the chargeable device.

14. The charging system of claim 10, wherein a port and/or wireless charging protocol of the connectivity system detects the chargeable device.

15. The charging system of claim 9, wherein the connectivity system further compares the detected temperature information with a determined temperature metric of the chargeable device.

16. The charging system of claim 9 further comprising a display showing a warning about charging the chargeable device at an excessive thermal condition.

17. An in-vehicle system for reducing thermal conditions in a wireless charging system comprising:
   a wirelessly powered charger;
   a chargeable device;
   a controller that detects temperature information related to the wirelessly powered charger and adjusts an amount of power provided to the chargeable device by the charger based on the detected temperature information; and
   a connectivity system that stores temperature metrics related to at least one chargeable device in a database, a port and/or wireless charging protocol of the connectivity system configured to detect the chargeable device.

18. The in-vehicle system of claim 17, wherein the connectivity system further determines cabin temperature inside a vehicle and compares the cabin temperature with a determined temperature metric of the chargeable device.

* * * * *